US006931851B2

(12) United States Patent
Litwin

(10) Patent No.: US 6,931,851 B2
(45) Date of Patent: Aug. 23, 2005

(54) SOLAR CENTRAL RECEIVER WITH INBOARD HEADERS

(75) Inventor: Robert Z. Litwin, Canoga Park, CA (US)

(73) Assignee: The Boeing Company, Chicago, IL (US)

( * ) Notice: Subject to any disclaimer, the term of this patent is extended or adjusted under 35 U.S.C. 154(b) by 343 days.

(21) Appl. No.: 10/318,890

(22) Filed: Dec. 13, 2002

(65) Prior Publication Data

US 2004/0112374 A1 Jun. 17, 2004

(51) Int. Cl.$^7$ .................................................. F03G 6/00
(52) U.S. Cl. ................................ 60/641.11; 60/641.15
(58) Field of Search ............................ 60/641.8, 641.9, 60/641.1, 641.11, 641.12, 641.14

(56) References Cited

U.S. PATENT DOCUMENTS

| | | | | |
|---|---|---|---|---|
| 4,136,674 A | * | 1/1979 | Korr | 126/607 |
| 4,245,618 A | * | 1/1981 | Wiener | 126/643 |
| 4,289,114 A | * | 9/1981 | Zadiraka | 126/587 |
| 4,485,803 A | * | 12/1984 | Wiener | 126/591 |
| 4,947,825 A | | 8/1990 | Moriarty | |
| 5,660,644 A | | 8/1997 | Clemens | |
| 5,850,831 A | | 12/1998 | Marko | |
| 5,862,800 A | * | 1/1999 | Marko | 126/680 |

OTHER PUBLICATIONS

Proceedings Solar Forum 2001: Solar Energy: The Power to Choose, Apr. 21–25, 2001, Washington, DC, "Solar Power Tower (SPT Design Innovations to Improve Reliability and Performance—Reducing Technical Risk and Cost".
SAND 2000–2598, "Lessons Learned, Project History and Operating Experience of the Solar Two Project", Bruce Kelly, Sandia National Laboratories Albuquerque, Nov. 2000 (relevant pages enclosed).

* cited by examiner

*Primary Examiner*—Hoang Nguyen
(74) *Attorney, Agent, or Firm*—Harness, Dickey & Pierce P.L.C.

(57) ABSTRACT

A solar power plant having a plurality of receiver panels mounted in a circular fashion about a solar receiver. Each receiver panel includes a plurality of tubes that terminate at each end at a header. To eliminate the presence of gaps between the tubes of adjacent receiver panels the headers are staggered or beveled. In the staggered configuration the headers of adjacent receiver panels are located in different elevations so that the headers of adjacent receiver panels may overlap each other, thus allowing the headers and tubes of adjacent receiver panels to be positioned closer together to eliminate gaps between the tubes of adjacent panels. In the beveled configuration the headers are angled such that the terminal ends of adjacent headers are parallel and positioned in a closely abutting relationship, resulting in the absence of gaps between adjacent headers and tubes.

25 Claims, 3 Drawing Sheets

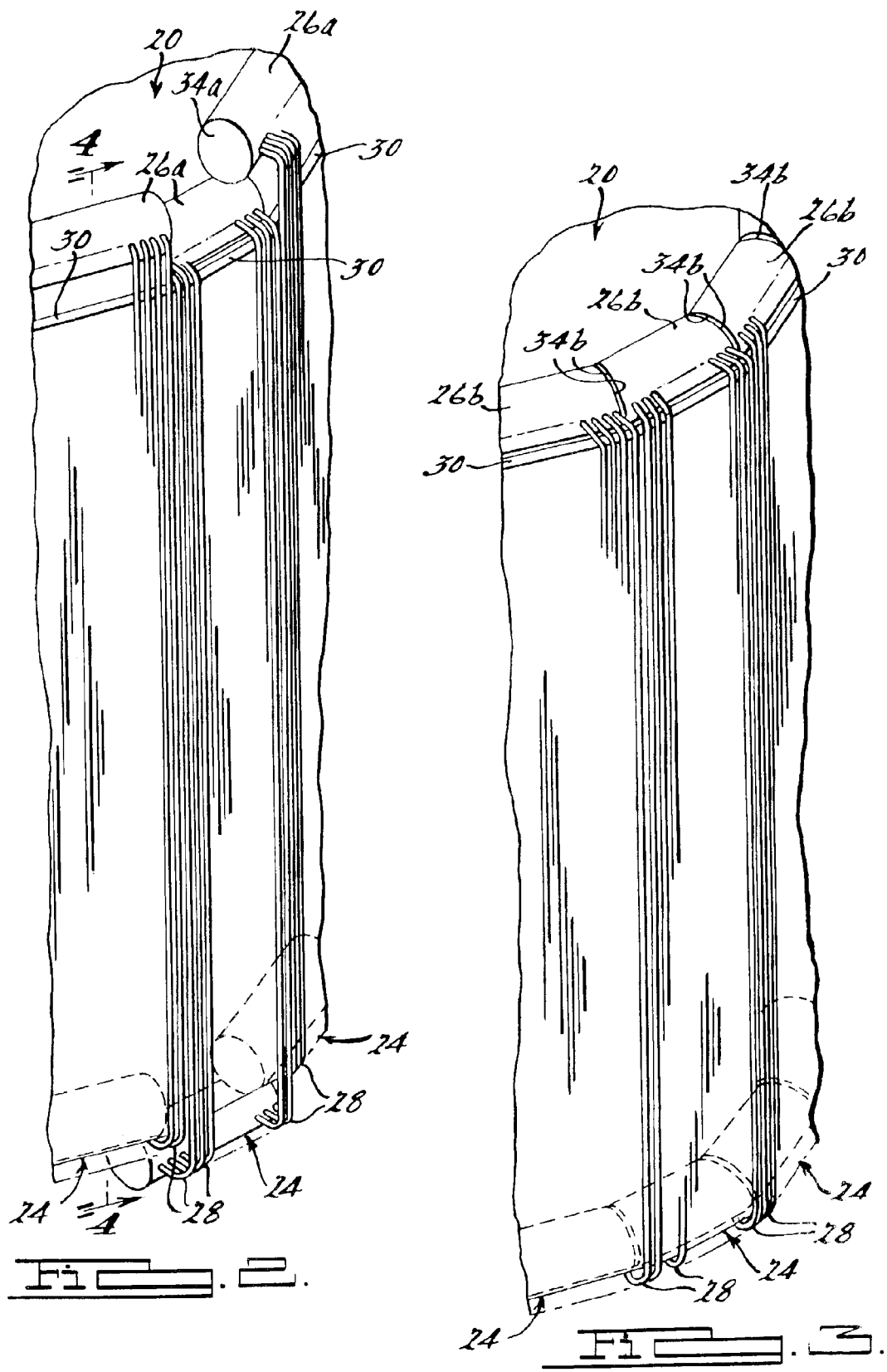

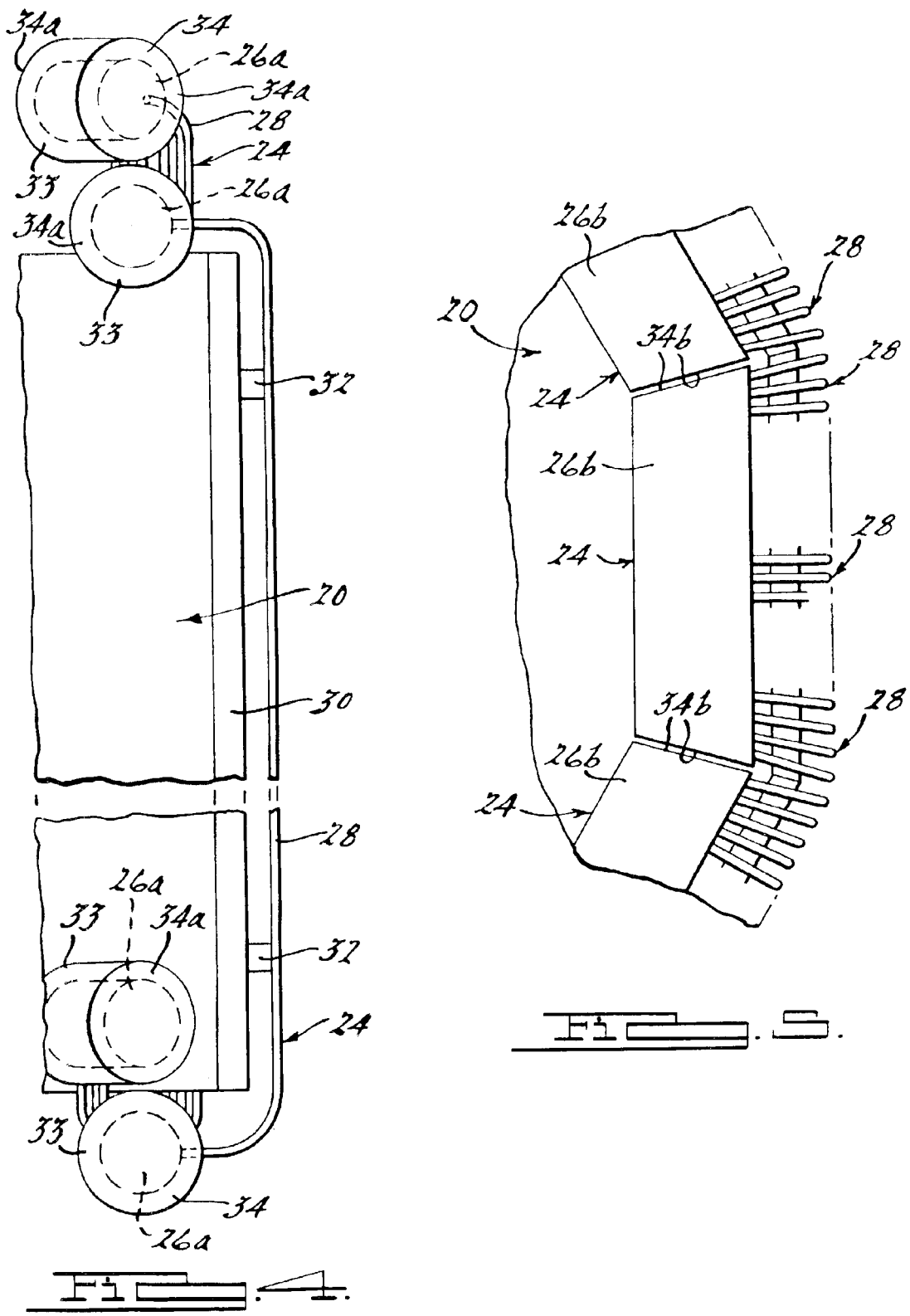

SOLAR CENTRAL RECEIVER WITH INBOARD HEADERS

FIELD OF THE INVENTION

The present invention relates to a solar central receiver power tower plant. More particularly, the present invention relates to an improved header design for a solar central receiver.

BACKGROUND OF THE INVENTION

Solar central receiver power plants are used to convert the sun's solar thermal energy into electrical energy for connection to a utility grid. Specifically, solar central receiver power plants intercept the sun's thermal energy using a collector system that includes a field of thousands of sun tracking mirrors called heliostats. The heliostats redirect and concentrate the solar thermal energy onto a circular, tower mounted, heat exchanger called a solar receiver. A plurality of planar receiver panels are positioned about the solar receiver for receiving the concentrated solar thermal energy.

The receiver panels each include a plurality of elongated tubes mounted to a suitable strong-back. The elongated tubes terminate at each end in a header. Molten salt coolant at a temperature of approximately 550° F. (287° C.) is pumped up to the solar receiver panels from a cold thermal storage tank located on the ground. The molten salt flows to a first header mounted at a first end of a first receiver panel. The header distributes the molten salt to each of the plurality of tubes in the first panel. As the molten salt flows along the length of the tubes it absorbs the concentrated solar energy.

After the molten salt flows the length of the tubes it is received by a second header located at a second end of the receiver panel. From the second header the salt is piped to a first header of a second receiver panel. The first header of the second panel distributes the molten salt flow to each of the tubes where additional solar energy is absorbed. Molten salt flow continues through subsequent receiver panels in this series pattern until the molten salt is heated to a temperature of approximately 1050° F. (585° C.) in a receiver panel that is last in the series of receiver panels.

From the second header of the last receiver panel the molten salt flows to a hot thermal storage tank on the ground. When the molten salt is needed to generate electricity it is pumped from the hot thermal storage tank to a steam generator where it surrenders heat to produce steam. The steam in turn is used to drive a turbine-generator to generate electricity.

Conventional headers are positioned behind the strong-back to better protect the headers. Positioning the headers behind the strong-back protects the headers from, among other things, weather damage and damage caused by the misdirection of sunlight (known as spillage) upon the headers by the heliostats. Positioning the headers behind the strong-back is also advantageous as it facilitates wrapping the headers with thermal insulation to minimize heat loss from the headers. Headers that face outward toward the concentrated solar flux are difficult to directly insulate due to the high temperature and damage imposed by the solar flux spillage that contacts these headers.

While there are numerous advantages associated with positioning the headers behind the strong-back, this configuration also presents some drawbacks. For example, because the headers are cylinders having opposing ends that each have a 90° surface relative to the main longitudinal length of the header, and the receiver panels are mounted on a cylindrical solar receiver, gaps are created between the headers, tubes, and strong-backs of neighboring receiver panels. Passage of solar energy through these gaps results in a loss of absorbed solar energy and possible damage to the interior components of the solar receiver.

Conventionally, the gaps between the tubes of neighboring receiver panels have been eliminated by bending the tubes in three dimensions such that the tubes extend beyond the width of the headers to fill the gaps. However, bending the tubes in this manner to fill the gaps is undesirable because it is complicated, time consuming, and costly. Thus, there is a need for an improved receiver panel design that eliminates the existence of gaps between the headers, tubes, and strong-backs of neighboring receiver panels and utilizes simplified tube bend designs and techniques.

SUMMARY OF THE INVENTION

The present invention overcomes the deficiencies of the prior art by providing a solar receiver free of gaps between adjacent receiver panels. Specifically, the present invention eliminates gaps between the headers, tubes, and strong-backs of adjacent receiver panels by staggering or beveling the receiver panel headers, thus permitting the adjacent receiver panels to be placed closer together to fill any gaps between them. In the staggered configuration the headers of adjacent receiver panels are located at different elevations so that the headers overlap but do not contact each other, thus permitting the tubes and strong-backs of adjacent receiver panels to be positioned closer together to eliminate any gaps between the tubes and strong-backs of the adjacent panels. In the beveled configuration the headers are angled such that the terminal ends of adjacent headers are disposed parallel to one another when assembled onto a support structure of the solar receiver. The terminal ends are further positioned in closely abutting relationship, thus eliminating any gaps between adjacent headers, tubes, and strong-backs. The use of a staggered or beveled header configuration is also advantageous as it eliminates any need to use complicated, expensive, and time consuming tube bending techniques and designs to fill gaps between the tubes of adjacent receiver panels.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a partial perspective view of a solar receiver of the solar central receiver power plant of FIG. 1 having a plurality of solar receiver panels secured to the solar receiver, the solar receiver panels having headers arranged in a staggered configuration;

FIG. 3 is a partial perspective view of a solar receiver of the solar central receiver power plant of FIG. 1 having a plurality of solar receiver panels secured to the solar receiver, the solar receiver panels having beveled headers.

FIG. 4 is a sectional side view of the solar receiver of FIG. 2 taken along line 4—4 in FIG. 2; and FIG. 5 is a partial top view of the solar receiver of FIG. 3.

DETAILED DESCRIPTION OF THE PREFERRED EMBODIMENTS

Figure 1:
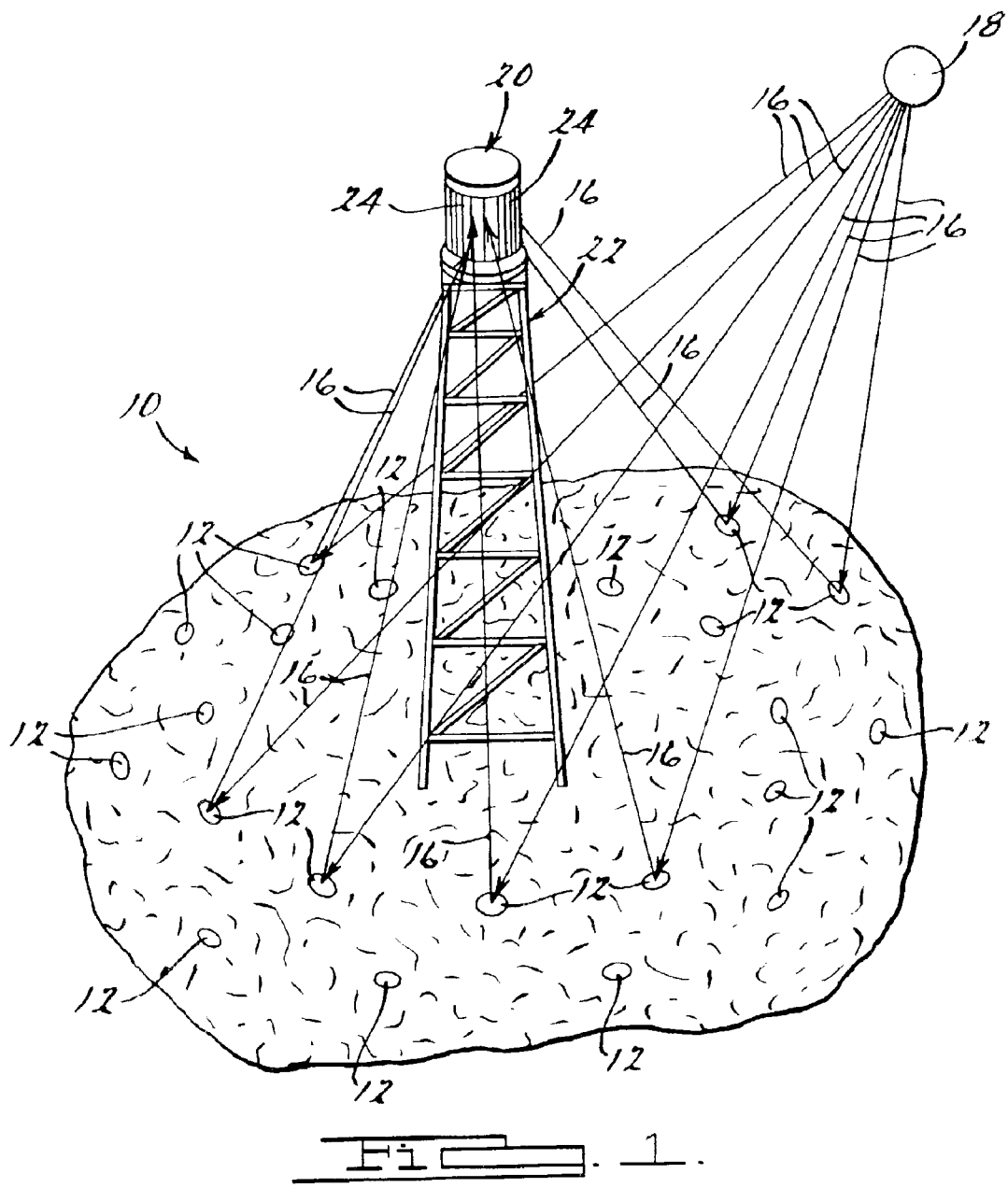
FIG. 1 is a simplified perspective view of a cylindrical, molten salt solar central receiver power plant with a surrounding heliostat field according to one of the preferred embodiments of the present invention.

The following description of the preferred embodiments is merely exemplary in nature and is in no way intended to limit the invention, its application, or uses.

Referring to FIG. 1, a solar power plant according to the present invention is generally shown at 10. The solar power plant 10 includes a plurality of heliostats 12 positioned about a heliostat field 14. The heliostats 12 are generally reflectors, preferably in the form of mirrors, that reflect a plurality of energy rays 16 originating from a solar source 18. The heliostats 12 reflect the solar energy rays 16 from the solar source 18 upon a solar receiver 20.

The solar receiver 20 is preferably cylindrical and positioned atop a tower 22. The tower 22 is preferably located at the approximate center of the heliostat field 14. Mounted about the solar receiver 20 are a plurality of solar receiver panels 24. As seen in FIGS. 2 through 5, each receiver panel 24 is generally comprised of two headers 26 connected by a plurality of vertically arranged tubes 28. The tubes 28 are mounted upon a suitable strong-back 30 using any suitable mounting device, such as a sliding bracket 32 (FIG. 4). The strong-back 30 is secured to the solar receiver 20 in any suitable manner.

As seen in FIGS. 2 through 4, the headers 26 are preferably positioned behind the strong-back 30 and are preferably wrapped in any suitable type of insulation 33 (FIG. 4), such as mineral wool. Positioning the headers 26 behind the strong-back 30 protects the headers 26, and the overlying insulation 33, from being damaged by misdirected energy rays 16 (spillage) that are not absorbed by the tubes 28. Further, positioning the headers 26 behind the strong-back 30 protects the headers 26 from the elements and prevents energy loss through the headers 26 during cold or windy conditions.

The headers 26 are preferably cylindrical and include two terminal ends 34. In order to eliminate any gaps between the tubes 28 of adjacent receiver panels 24 and produce an uninterrupted wall of tubes 28 about the solar receiver 20, the headers 26 are either staggered (FIGS. 2 and 4) or beveled (FIGS. 3 and 5).

Headers 26 positioned in the staggered configuration are illustrated in FIGS. 2 and 4 at reference numeral 26a. In the staggered configuration the headers 26a may be of any suitable shape or design, but are preferably cylinders with straight terminal ends 34a (i.e. the ends 34a form right angles to the main longitudinal length of the headers 26a). The receiver panels 24 are positioned such that the headers 26a of adjacent receiver panels 24 are in different elevations. Positioning the headers 26a at different elevations permits the opposing ends of the headers 26a of adjacent panels 24 to overlap by a small degree. This overlap of headers 26a permits the placement of adjacent receiver panels 24 closer together to eliminate gaps between the headers 26a, the adjacent tubes 28, and the adjacent strong-backs 30 of the adjacent receiver panels 24, thus providing a continuous wall of vertical tubes 28 around the solar receiver 20 without having to perform complex, expensive, and time consuming bending of the tubes 28.

With reference to FIGS. 3 and 5, the headers 26 may also be beveled headers 26b. Specifically, the beveled headers 26b are oblique cylinders with angled terminal ends 34b. The terminal ends 34b are angled such that the terminal ends 34b of adjacent headers 26b are parallel and closely abut each other when seated at the same elevation. The angled terminal ends 34b allow adjacent headers 26b to remain in close proximity and eliminate gaps between adjacent headers 26b, even though the adjacent receiver panels 24 are angled relative to each other due to their placement about the circular solar receiver 20. The beveled headers 26b not only eliminate gaps between the headers 26b, but also eliminate gaps between the strong-backs 30 and tubes 28 of adjacent panels 24 as the tubes 28 extend from the headers 26b. Thus, the beveled headers 26b allow for the formation of a continuous wall of vertical tubes 28 around the solar receiver 20 without the need for performing a complex, expensive, and time consuming bending of the tubes 28.

The operation of the solar power plant 10 will now be described. In operation, molten salt at a temperature of approximately 550° F. is pumped from a cold thermal storage tank (not shown), preferably located on the ground, to the solar receiver panels 24. The molten salt is pumped into a first header 26 of a first receiver panel 24 and distributed through the tubes 28 connected to the first header 26. As the molten salt travels the length of the tubes 28 the molten salt absorbs the solar energy rays 16 directed at the tubes 28 and upon exiting the tubes 28 is collected by a second header 26 located at an end of the first panel 24 opposite the first header 26. The molten salt is next piped to the first header 26 of a second receiver panel 24 adjacent to the first receiver panel 24 and the process of solar heat absorption into the molten salt continues through the remaining receiver panels 24 until the molten salt temperature is heated to approximately 1050° F. Subsequently, the molten salt flows to a hot thermal storage tank (not shown) preferably located in the ground of the heliostat field 14. When the molten salt is needed to generate electricity it is pumped from the hot thermal storage tank to a steam generator (not shown) where the molten salt surrenders heat to produce steam. The steam in turn is used to drive a turbine generator (not shown) to make electricity.

Thus, the present invention provides for a solar power plant 10 having a plurality of receiver panels 24 mounted in a circular fashion about a cylindrical solar receiver 20. Each receiver panel 24 includes a plurality of tubes 28 that terminate at each end at a header 26. To eliminate the presence of gaps between the tubes 28. headers 26, and strong-backs 30 of adjacent receiver panels 24, the headers 26 are either staggered (FIGS. 2 and 4) or beveled (FIGS. 3 and 5). The staggered headers 26a of adjacent receiver panels 24 are positioned in different elevations so that the headers 26a of adjacent receiver panels 24 may overlap each other, thus allowing the headers 26 and tubes 28 of adjacent panels 24 to be positioned closer together to eliminate any gaps between the tubes 28, headers 26, and strong-backs 30 of adjacent panels 24. In the beveled configuration the headers 26b are angled such that the terminal ends 34 of adjacent headers 26b are parallel and positioned in a closely abutting relationship, resulting in the absence of gaps between adjacent headers 26b, tubes 28, and strong-backs 30. Both configurations enable even more efficient collection of solar energy 16 reflected by the heliostats 12 and protect the internal structure of the receiver 20 from thermal energy that may otherwise enter between the panels 24. Further, by locating the headers 26 behind the strong-back 30, both configurations protect the headers 26 and insulation 33 from extreme weather conditions and solar spillage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solar power system comprising:
   a first receiver panel comprised of at least one tube for capturing solar energy;
   a second receiver panel comprised of at least one tube for capturing solar energy, said second receiver panel disposed in close proximity to said first receiver panel to form a space between said first receiver panel and said second receiver panel;
   a third receiver panel comprised of at least one tube for capturing solar energy disposed between said first receiver panel and said second receiver panel to effectively occupy said space;
   each of said tubes extending across each of said receiver panels to form a substantially continuous tube surface across said first receiver panel, said second receiver panel, and said third receiver panel;
   a first header secured to a first end of said at least one tube of each of said first, second, and third receiver panels for introducing a fluid that absorbs solar energy into said tubes; and
   a second header secured to a second end of said at least one tube of each of said first, second, and third receiver panels for collecting said fluid after said fluid passes through said tube;
   wherein said headers of said first receiver panel are disposed in a first plane, said headers of said third receiver panel are disposed in a second plane laterally offset from said first plane, and said headers of said second receiver panel are disposed in said first plane such that said headers of said first receiver panel and said second receiver panel at least partially overlap said headers of said third receiver panel.

2. The solar power system of claim 1, wherein said headers are beveled.

3. The solar power system of claim 1, wherein said fluid comprises molten salt.

4. The solar power system of claim 1, wherein said fluid comprises molten salt.

5. The solar power system of claim 1, wherein said first, said second, and said third receiver panels are mounted to a tower mounted solar receiver.

6. The solar power system of claim 1, wherein said energy is directed to said first, said second, and said third receiver panels by at least one heliostat.

7. The solar power system of claim 2, wherein said first beveled header and said second beveled header are each positioned on an interior side of each of said first, said second, and said third receiver panels.

8. The solar power system of claim 1, wherein said first header and said second header are each positioned on an interior side of each of said first, said second, and said third receiver panels.

9. A solar power system providing a substantially uninterrupted solar absorption surface and being operable to receive solar energy from a solar energy source, said solar power system comprising:
   a heliostat field comprised of at least one heliostat for reflecting said solar energy;
   a solar receiver comprised of:
      a first receiver panel for receiving said reflected solar energy, and being disposed in a first plane;
      a second receiver panel for receiving said reflected solar energy and being disposed laterally adjacent said first receiver panel in said first plane and at a common radius with said first receiver from an axial center of said solar receiver to form a space between said first receiver panel and said second receiver panel;
      a third receiver panel for receiving said solar energy disposed laterally between said first receiver panel and said second receiver panel in a second plane laterally offset from said first plane and disposed at said common radius with said first and second receiver panels from said axial center of said solar receiver to effectively occupy said space; and
      a substantially continuous receiver panel surface for receiving said reflected solar energy comprised of said first receiver panel, said second receiver panel, and said third receiver panel.

10. The solar power system of claim 9, wherein said first receiver panel, said second receiver panel, and said third receiver panel each comprise:
    at least one tube for receiving a fluid for absorbing said solar energy, said tube extending the length of said receiver panels in a single vertical plane;
    a first header secured to a first end of said at least one tube for introducing said fluid into said tube; and
    a second header secured to a second end of said at least one tube for collecting said fluid after said fluid passes through said tube;
    wherein said headers of said first receiver panel are disposed in a first header plane, said headers of said second receiver panel are disposed in said first header plane, and said headers of said third receiver panel are disposed in a second header plane such that said headers of said first receiver panel and said second receiver panel overlap said headers of said third receiver panel to form a substantially uninterrupted surface of said tubes across said first receiver panel, said second receiver panel, and said third receiver panel.

11. The solar power system of claim 10, wherein said fluid comprises molten salt.

12. The solar power system of claim 9, wherein said solar receiver is mounted above said heliostat field atop a tower.

13. The solar power system of claim 10, wherein said first header and said second header are each positioned on an interior side of each of said first, said second, and said third receiver panels.

14. A solar power system providing a substantially uninterrupted solar absorption surface and responsive to solar energy from a solar energy source, said solar power system comprising:
    a heliostat field comprised of at least one heliostat for directing said solar energy;
    a solar receiver comprised of:
       a first receiver panel for receiving said solar energy;
       a second receiver panel for receiving said solar energy disposed laterally adjacent said first receiver panel to form a space between said first receiver panel and said second receiver panel; and
       a third receiver panel, disposed laterally in-between said first and said second receiver panels for receiving said solar energy and for effectively occupying said space;
       a substantially continuous receiver panel surface for receiving said solar energy comprised of said first receiver panel, said second receiver panel, and said third receiver panels;

wherein said first receiver panel, said second receiver panel, and said third receiver panel each comprise:

at least one tube for receiving a fluid for absorbing said solar energy, said at least one tube extending the length of said receiver panels in a single vertical plane;

a first beveled header secured to a first end of said at least one tube for introducing said fluid into said tube;

a second beveled header secured to a second end of said at least one tube for collecting said fluid after said fluid passes through said tube; and wherein said tubes form a substantially uninterrupted surface of said tubes across said first receiver panel, said second receiver panel, and said third receiver panel; and wherein said beveled headers of said first, said second, and said third receiver panels are placed at a single elevation in a common horizontal plane.

15. The solar power system of claim 14, wherein said fluid comprises molten salt.

16. The solar power system of claim 14, wherein said solar receiver is mounted above said heliostat field atop a tower.

17. The solar power system of claim 14, wherein said heliostat comprises a sun tracking mirror.

18. The solar power system of claim 14, wherein said first beveled header, said second beveled header, and said third beveled header are positioned on an interior side of said first, said second, and said third receiver panels.

19. A method for collecting solar energy, comprising:

mounting a first receiver panel to a solar receiver to receive solar energy;

mounting a second receiver panel to said solar receiver to receive solar energy, said second receiver panel being positioned adjacent said first receiver panel about a common radius with said first receiver panel around an axial center of said solar receiver such that a space is formed therebetween; and mounting a third receiver panel to said solar receiver to receive solar energy positioned between said first and said second receiver panels about said common radius with said first and second receiver panels around said axial center of said solar receiver, but offset elevationally from said first and second receiver panels, to substantially occupy said space and form a substantially continuous receiver panel surface for receiving solar energy comprised of said first receiver panel, said second receiver panel, and said third receiver panel.

20. The method of claim 19, further comprising:

providing a header at at least one end of each of said receiver panels, and disposing said third receiver panel such that said header thereof is elevationally offset from said headers of said first and second receiver panels and thus overlaps said headers of said first and second receiver panels.

21. The method of claim 20, further comprising:

positioning said header on an interior side of each of said receiver panels.

22. The method of claim 20, further comprising:

positioning at least one tube between two of said headers for receiving a fluid that absorbs said solar energy, said tubes extending between said headers in a single vertical plane and forming a substantially uninterrupted surface of said tubes across said first receiver panel, said second receiver panel, and said third receiver panel.

23. A method of forming a solar receiver, comprising:

using a first receiver panel having at least one header with beveled end portions to receive solar energy;

using a second receiver panel having at least one header with beveled end portions to receive solar energy, said second receiver panel being positioned adjacent said first receiver panel; and using a third receiver panel having at least one header with beveled end portions to receive solar energy, said third receiver panel being disposed between said first and said second receiver panels to form a substantially continuous receiver panel surface for receiving solar energy comprised of said first receiver panel, said second receiver panel, and said third receiver panel.

24. The method of claim 23, further comprising:

positioning said headers on an interior side of each of said first receiver panel, said second receiver panel, and said third receiver panel.

25. The method of claim 23, further comprising:

positioning at least one tube between two of said headers for receiving a fluid that absorbs said solar energy, said tubes extending between said headers in a single vertical plane and forming a substantially uninterrupted surface of said tubes across said first receiver panel, said second receiver panel, and said third receiver panel.

* * * * *